United States Patent
Marquardt et al.

(10) Patent No.: US 9,147,147 B2
(45) Date of Patent: Sep. 29, 2015

(54) PLUG-IN PORTABLE DATA CARRIER WITH SEMI-DETACHABLE TOKEN HOLDER

(71) Applicant: Giesecke & Devrient America, Inc., Dulles, VA (US)

(72) Inventors: Scott Marquardt, Dulles, VA (US); Michael Tagscherer, Munich (DE)

(73) Assignee: Giesecke & Devrient America, Inc., Dulles, VA (US)

( * ) Notice: Subject to any disclaimer, the term of this patent is extended or adjusted under 35 U.S.C. 154(b) by 0 days.

(21) Appl. No.: 14/191,344

(22) Filed: Feb. 26, 2014

(65) Prior Publication Data

US 2015/0242738 A1   Aug. 27, 2015

(51) Int. Cl.
   *G06K 19/077*   (2006.01)
(52) U.S. Cl.
   CPC ................. *G06K 19/07739* (2013.01)
(58) Field of Classification Search
   CPC ............................... G06K 19/07739
   USPC ......................................... 235/492
   See application file for complete search history.

(56) References Cited

U.S. PATENT DOCUMENTS

| 6,448,638 | B1* | 9/2002 | Fidalgo et al. | 257/679 |
| 6,561,432 | B1* | 5/2003 | Vedder et al. | 235/492 |
| 6,575,375 | B1 | 6/2003 | Boccia et al. | |
| 6,964,377 | B1* | 11/2005 | Haghiri et al. | 235/492 |
| 7,341,198 | B2* | 3/2008 | Nishizawa et al. | 235/492 |
| 7,726,578 | B2* | 6/2010 | Froger et al. | 235/492 |

FOREIGN PATENT DOCUMENTS

| DE | 10344049 A1 | 6/2004 |
| JP | 4263862 B2 | 5/2009 |

* cited by examiner

*Primary Examiner* — Thien M Le
*Assistant Examiner* — Toan Ly
(74) *Attorney, Agent, or Firm* — Baker Botts L.L.P.

(57) ABSTRACT

A portable data carrier with a card body in which an integrated circuit is embedded may include a token, a token holder, and one or more fixing portions. The token may comprise the integrated circuit. The token holder may include a first end and a second end, the first end configured to flexibly extend from the card body, and the second end configured to be releasably attached to the token, and a separation line along a length of the token holder between the token holder and the token, the separation line configured to allow the token to be detached from the token holder. The one or more fixing portions may be configured to releasably hold the token and the token holder to corresponding portions of the card body surrounding the token and the token holder.

8 Claims, 1 Drawing Sheet

PLUG-IN PORTABLE DATA CARRIER WITH SEMI-DETACHABLE TOKEN HOLDER

BACKGROUND OF THE INVENTION

1. Field of the Invention

The invention relates generally to portable data carriers, in particular to the chip cards or tokens. Specifically, the invention relates to the storage and delivery configuration of such chip cards and tokens.

2. Description of Related Art

Chip cards, also known as smart cards, generally comprise a thin card body with embedded integrated circuits (i.e., at least one semiconductor chip), and has dimensions and characteristics that meet the requirements of ISO/IEC standards 7810 and 7816. Chip cards may be used for identification, data authentication and storage, and application processing.

Known chip card designs may have a chip card capable of being inserted into a chip card slot or a USB hub. The chip card may include a token (e.g., a subscriber identity module, or "SIM" card) that has a semiconductor chip with an integrated circuit located at an end portion of a token holder. In addition, a slot surrounds the token holder, and the token holder may be formed in one piece with the rest of the chip card from a flexible plastics material. Further, the chip card may have a hinge that fixes the token holder to a position in a chip card plane, and allows the token holder to be reversibly bent or folded out of the chip card plane and bent or folded back into the chip card plane again.

In certain situations, however, users may need a chip card that allows the token to be completely removed from the chip card and used as a separate token for additional flexibility.

SUMMARY OF THE INVENTION

According to an embodiment of the present invention, a portable data carrier with a card body in which an integrated circuit is embedded comprises a token, a token holder, and one or more fixing portions. The token may comprise the integrated circuit. The token holder may comprise a first end and a second end, the first end configured to flexibly extend from the card body, and the second end configured to be releasably attached to the token. The token holder may also comprise a separation line along a length of the token holder between the token holder and the token, the separation line configured to allow the token to be detached from the token holder. The one or more fixing portions may be configured to releasably hold the token and the token holder to corresponding portions of the card body surrounding the token and the token holder. Specifically, the one or more fixing portions may comprise a first fixing portion disposed at an edge of the token opposite the token holder and connecting the token with the corresponding portion of the card body. According to this embodiment, the first fixing portion is configured to hold the token in a chip card plane position when the token holder is in the chip card plane position, and the first fixing portion is configured to be detached from the token when the token is flexibly moved away from the chip card plane position.

Other objects, features, and advantages of the present invention are apparent to persons of ordinary skill in the art in view of the following detailed description of embodiments of the invention and the accompanying drawings.

BRIEF DESCRIPTION OF THE DRAWINGS

For a more complete understanding of the embodiments of the present invention, needs satisfied thereby, and the objects, features, and advantages thereof, reference now is made to the following description taken in connection with the accompanying drawings.

DETAILED DESCRIPTION OF EMBODIMENTS OF THE INVENTION

Figure 1:
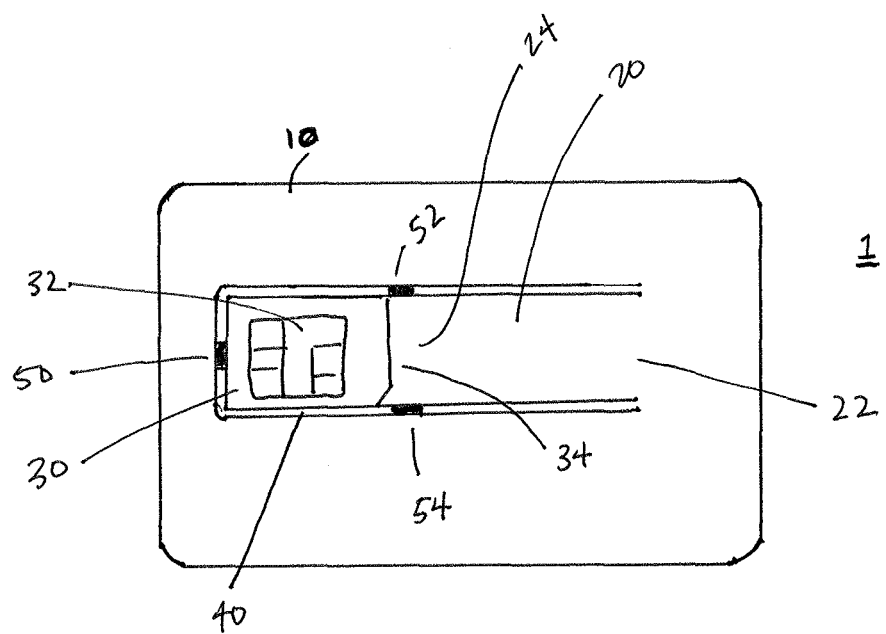
FIG. 1 is a plan view of a portable data carrier in the form of a chip card according to an embodiment of the invention.
Figure 2:
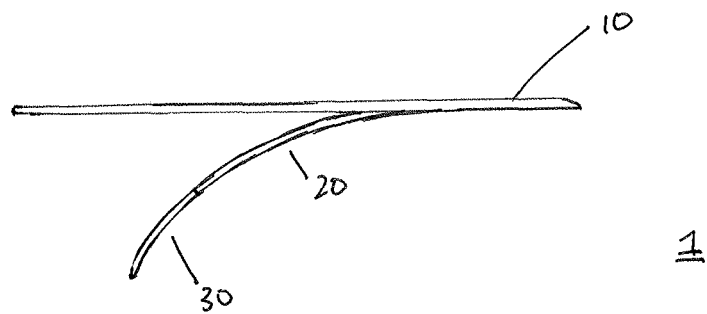
FIG. 2 is a side view of the chip card of FIG. 1 according to an embodiment of the invention.

Exemplary embodiments of the present invention, and their features and advantages, may be understood by referring to FIGS. 1 and 2, like numerals being used for corresponding parts in the various drawings.

Referring to FIG. 1, a portable data carrier in the form of a chip card is now described. Portable data carrier 1 includes a card body 10. Card body 10 may have dimensions similar to a credit card, and may be made of a flexible plastic material. Exemplary embodiments provide for card body 10 to comprise an ID-1 format. Portable data carrier 1 may include a token holder 20, which includes a first end 22 that is connected with card body 10 and a second end 24 that is opposite to first end 22. Second end 24 may be connected to and releasably attached to a token 30 with an embedded integrated circuit 32. A separation line 34 is disposed between token 30 and second end 24 of token holder 20, and delineates a side of token 30. Exemplary embodiments provide for the separation line 34 to comprise a plurality of perforations; alternate embodiments provide for the separation line to comprise a groove. Surrounding token holder 20 along two edges, and surrounding token 30 along three edges may be a surrounding slot 40. Surrounding slot 40 may be a small u-shaped spacing surrounding token 30 and token holder 20.

Due to the flexible material of card body 10, token holder 20 is capable of being reversibly bent or folded out of a chip card plane (i.e., the plane that extends along the length of the chip card) and bent or folded back into the chip card plane again (see FIG. 2). For example, token holder 20 can be bent to permit removal of token 30, so that it can be detached from token holder 20, preferably along perforation line 34. During production and/or delivery of portable data carrier 1, however, token holder 20 may be inadvertently bent out of the chip card plane, and token 30 may be damaged as a result. Thus, portable data carrier 1 includes one or more fixing portions 50, 52, 54 that fix token holder 20 and token 30 to card body 10 during production and/or delivery. Specifically, fixing portion 50 may be disposed along an edge of token 30, and preferably at a center portion of the edge of token 30, opposite to second end 24 of token holder 20. In addition, fixing portions 52 and 54 may be disposed adjacent to perforation line 34 at second end 24 of token holder 20 opposite to one another. Moreover, the location of fixing portions 52 and 54 on the token holder 20, and not on token 30, helps avoid the situation in which pieces of the fixing portions, or "burrs," are retained on token 30 after token 30 is detached from token holder 20. Thus, this configuration minimizes situations in which token 30 may not fit into a token slot (e.g., a smart card slot, a USB slot, or any other suitable slots) due to these burrs.

When token 30 is to be detached from token holder 20 and removed from card body 10, token holder 20 may be reversibly bent out of the chip card plane (FIG. 2) for easy access and removal of token 30. In some embodiments, when token holder 20 is bent out of the chip card plane, fixing portion 50 detaches from token 30 and fixing portions 52 and 54 remain attached to token holder 20 to hold token holder 20 in place while token 30 is detached along perforation line 34 and removed from card body 10. In some embodiments, when token holder 20 is bent out of the chip card plane, fixing portion 50, in addition to fixing portions 52 and 54, detach from token 30 and token holder 20, respectively, and allow for easier bending of token holder 20 and removal of token 30 along perforation line 34. In addition, in some embodiments, token holder 20 may first be bent out of the chip card plane for easy access of token 30, permitting token 30 to be inserted into a token slot prior to being removed from token holder 20. After token 30 is securely inserted into the token slot, token 30 can then be detached and removed from token holder 20 by snapping along perforation line 34.

While the invention has been described in connection with preferred embodiments, it will be understood by those of ordinary skill in the art that other variations and modifications of the preferred embodiments described above may be made without departing from the scope of the invention. Other embodiments will be apparent to those of ordinary skill in the art from a consideration of the specification or practice of the invention disclosed herein. The specification and the described examples are considered as exemplary only, with the true scope and spirit of the invention indicated by the following claims.

What is claimed is:

1. A portable data carrier with a card body in which an integrated circuit is embedded, comprising:
   a token comprising the integrated circuit;
   a token holder comprising:
      a first end and a second end along a first direction, the first end configured to flexibly extend from the card body in the first direction, and the second end configured to be releasably attached to the token, and
      a separation line extending in a second direction along a length of the token holder between the token holder and the token, the separation line configured to allow the token to be detached from the token holder, and the second direction being orthogonal to the first direction; and
   one or more fixing portions configured to releasably hold the token and the token holder to corresponding portions of the card body surrounding the token and the token holder, the one or more fixing portions comprising:
      a first fixing portion disposed at a first end of the token in the first direction and connecting the token with a first corresponding portion of the card body,
         wherein the first end of the token is opposite to a second end of the token along the first direction, the separation line being formed at the second end of the token,
         wherein the first fixing portion is configured to hold the token in a chip card plane position when the token holder is in the chip card plane position, and
         wherein the first fixing portion is configured to be detached from the token when the token is flexibly moved away from the chip card plane position;
      a second fixing portion disposed at a first position on a first side of the token holder in the second direction and connecting the token holder with a second corresponding portion of the card body; and
      a third fixing portion disposed at a second position on a second side of the token holder and connecting the token holder with a third corresponding portion of the card body,
         wherein the second side of the token holder is opposite to the first side of the token holder along the second direction, and
         wherein the first side of the token holder and the second side of the token holder extend in the first direction.

2. The portable data carrier of claim 1, wherein the first fixing portion is disposed at a center portion of the first end of the token.

3. The portable data carrier of claim 1, wherein the separation line comprises a plurality of perforations.

4. The portable data carrier of claim 1, wherein the separation line comprises a groove.

5. The portable data carrier of claim 1, further comprising:
   a surrounding slot that surrounds the token holder and the token,
   wherein the surrounding slot comprises a u-shaped space.

6. The portable data carrier of claim 1, wherein the first position and the second position are adjacent to the second end of the token holder.

7. The portable data carrier of claim 6, wherein the second fixing portion and the third fixing portion are configured to hold the token holder in the chip card plane position when the token is removed from the card body.

8. The portable data carrier of claim 7, wherein the second fixing portion and the third fixing portion are configured to be detached from the token holder when the token holder is flexibly moved away from the chip card plane position.

* * * * *